United States Patent

Harvey et al.

Patent Number: 5,853,574
Date of Patent: Dec. 29, 1998

[54] METHOD OF DISINFECTING WATER WITH IODINE SPECIES

[75] Inventors: Wayne A. Harvey, Halifax; Terence F. Mullins; Daniel J. MacDonald, both of Dartmouth, all of Canada

[73] Assignee: IoSolutions Incorporated, Nova Scotia, Canada

[21] Appl. No.: 53,129

[22] Filed: Apr. 1, 1998

Related U.S. Application Data

[62] Division of Ser. No. 701,762, Aug. 22, 1996.

[51] Int. Cl.⁶ ...................................................... C02F 1/76
[52] U.S. Cl. ........................ 210/103; 210/198.1; 210/206
[58] Field of Search ............................ 210/87, 101, 103, 210/134, 198.1, 205, 206

[56] References Cited

U.S. PATENT DOCUMENTS

| | | | |
|---|---|---|---|
| 3,189,518 | 6/1965 | Glasgow | 210/753 |
| 3,215,627 | 11/1965 | Tools | 210/753 |
| 4,367,149 | 1/1983 | Kinman | 210/753 |
| 4,384,960 | 5/1983 | Polley | 210/753 |
| 4,526,751 | 7/1985 | Gartner | 422/37 |
| 4,555,347 | 11/1985 | O'Dowd et al. | 210/753 |
| 5,093,024 | 3/1992 | Roydhouse | 422/37 |
| 5,196,126 | 3/1993 | O'Dowd | 422/37 |
| 5,401,399 | 3/1995 | Magnusson et al. | 210/206 |
| 5,552,057 | 9/1996 | Hughes et al. | 210/753 |
| 5,637,230 | 6/1997 | Billings | 210/206 |

OTHER PUBLICATIONS

Berg et al., "Devitalization of Microorganisms by Iodine", Virology, 22, pp. 469–481, (1964).

(List continued on next page.)

*Primary Examiner*—Jay H. Woo
*Assistant Examiner*—Betsey J. Morrison
*Attorney, Agent, or Firm*—Pillsbury Madison & Sutro LLP

[57] ABSTRACT

A water treatment system and apparatus for producing bacteria- and virus-free water from a bacteria and virus-containing water supply, said apparatus comprising (a) generator means for holding solid elemental iodine and to allow solubilization of said iodine under dynamic aqueous flow;

(b) means for feeding a first portion of said water supply to said generator means to produce an aqueous concentrated iodine solution;

(c) means for providing a second portion of said water supply;

(d) means for providing said aqueous concentrated iodine solution to said second portion of said water supply to provide a blended water supply;

(e) storage means for holding said blended water supply to provide said bacteria- and virus-free water;

(f) means for measuring water flow of said first and said second portions;

(g) means for measuring the pH of said second portion;

(h) means for adjusting the pH of said second portion;

(i) means for measuring the temperature of said concentrated aqueous solution; and (j) control means for receiving flow data, pH data and temperature data from said means for measuring flow of said first and said second portions, said means for measuring pH of said second portion; said means for measuring temperature of said concentrated aqueous solution and means for adjusting pH of said second portion. The system provides an efficacious way of killing virus under the guidelines and standards set by the USEPA.

3 Claims, 1 Drawing Sheet

OTHER PUBLICATIONS

Hsu et al., "Some Bactericidal and Virucidal Properties of Iodine Not Affecting Infections RNA and DNA", Journal of Epidemiology, vol. 82, No. 3, pp. 317–328, (1996).

Cramer et al., "Chlorination and Iodination of Poliovirus and $f_2$", Journal WPCF, vol. 48, No. 1, pp. 61–76, (1976).

Taylor et al., "A Comparison of the Virucidal Properties of Chlorine Dioxide, Bromine Chloride and Iodine", J. HYG, CAMB., 89, pp. 321–328, (1982).

Alvarez et al., "Mechanisms of Inactivation of Poliovirus by Chlorine Dioxide and Iodine", Applied and Environmental Microbiology, vol. 44, No. 5, pp. 1064–1071, (1982).

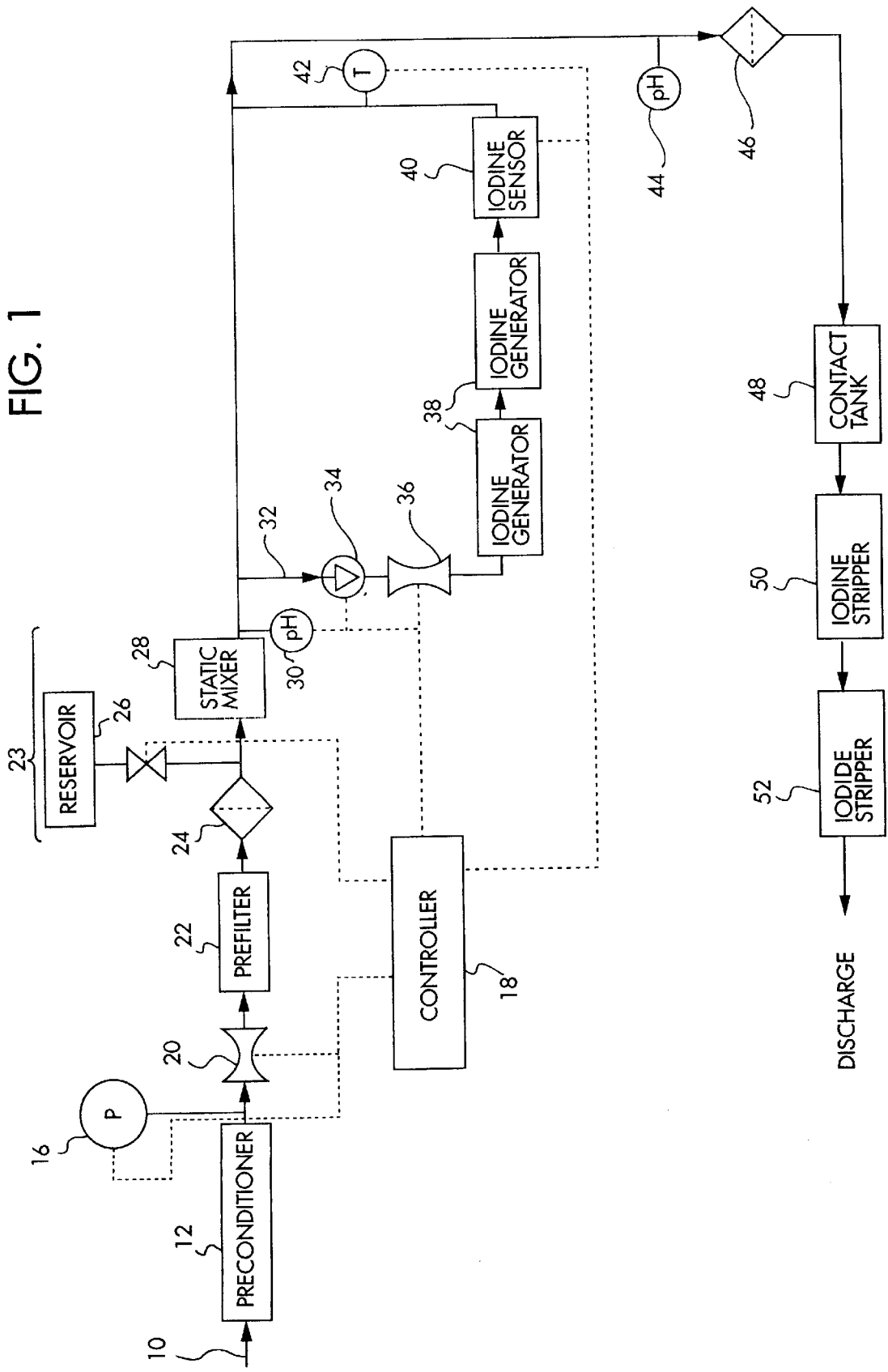

METHOD OF DISINFECTING WATER WITH IODINE SPECIES

This is a division of application Ser. No. 08/701,762, pending filed Aug. 22, 1996.

FIELD OF THE INVENTION

This invention relates to a method of disinfecting water with iodine species, particularly, hypoiodous acid and dissolved molecular iodine.

BACKGROUND TO THE INVENTION

Iodine has been used for water disinfection on a large scale in the past. Iodine is used commonly also for its antibiotic (sensu stricto) effects against bacteria, viruses and cysts, as these three pathogens constitute the most common health risks in maintaining biologically safe water supplies. Traditionally, crystalline iodine is dissolved in water under static conditions by the addition of small amounts of KI, which greatly enhances the dissolution of the iodine.

Of particular interest in a drinking water context, are those bacteria responsible for widespread occurrences and recurrences of intestinal infections in humans, namely, the coliform family of bacteria, e.g., *E coli*. These bacteria commonly contaminate drinking water supplies when waste water containing faecal material spills into a water supply, or when excessive anaerobic decay of vegetation in the water supply occurs. In general, the actual inactivation mechanism of the pathogenicity of both bacteria, viruses and cysts by iodine is poorly understood.

Poliovirus 1 (Polio 1) is particularly prevalent in third world countries, where immunization programs are almost non-existent, and local drinking water supplies and sewage waters run side-by-side.

To-date, iodine is generally provided from an iodophor source or as an aqueous solution by the use of KI to aid the dissolution of iodine. Most treatments employ pHs lower or higher than about 9.

Dissolved iodine hydrolyzes in aqueous solutions to form hypoiodous acid, HOI, in amounts proportional to the pH of the solution, wherein above pH 8.5, iodine is present almost exclusively as HOI. Both dissolved $I_2$ and HOI possess antipathogenic properties. At pHs 5–7, iodine, as $I_2$, exhibits antibacterial action and at higher pHs, e.g. 7–10, HOI is an efficient virucide. Chang (1) reports that above pH 8, HOI decomposes slowly to form iodide and iodate ions, especially in the presence of dissolved iodides. Neither iodides nor iodates have been found to be germicidal. Further, $I^-$ reacts with $I_2$ to form the highly coloured $I_3^-$ ion, which is also ineffectual as a germicide.

Various tinctures of iodine may be generated upon dissolving the solid in organic liquids such as ethanol, acetone, diethyl ether, toluene, p-xylene, benzene and carbon disulphide. Additionally, many organic preparations of iodine may be generated by reacting appropriate organics with iodine, e.g., iodoform, methylene iodide. Among the most popular commercial iodine-organic complexes are the PVP-iodines, iodoforms and povidone-iodine preparations, which are used as detergents and antiseptics. Most of these compounds exhibit germicidal action upon dilution in water, whereupon the iodine is hydrated and released into the water, usually as molecular iodine. Many biocidal, organic iodine compounds are commonly referred to as iodophors.

Traditionally, iodine-bearing resins are made by attaching $I_2$, tri-, penta- and hepta-iodide ions to quaternary ammonium, styrene-divinyl benzene, cross-linked anion-exchange resins. Upon elution with water, the polyiodides and iodine are released from the resin via anion-exchange mechanisms. These resins are thought to operate on a demand-type basis, where iodine will only be released in the presence of a germicidal load in the water passing through the resins, by the following mechanisms; (1) iodine release aided by an internal exchange mechanism involving $I_2$ transfer through a polyiodide intermediate, (2) hydrolysis of iodine on the resin to produce HOI, (3) simple release of $I_2$ by the resin-polyiodide combination and/or organic resin matrix.

Berg et al (2) showed that, dissolved, elemental iodine in the presence of KI to enhance solubility of iodine at a pH=6 and an iodine concentration of about 2 ppm at 15° C., killed Polio I to the 99.99% level after a 1 minute contact time,. Although this kill-level does comply with the USEPA (United States Environmental Protection Agency) guidelines, the experimental conditions do not, because the required kill must be achieved at 4° C. Additionally, the amount of virus used was about $4.13 \times 10^4$ PFU/ml, which is about 2 times more than the USEPA testing protocol specifies. This reference shows that Polio 1 can be effectively killed at lower pH than traditionally expected by earlier research, that the rates of kill are increased with increasing concentration of iodine, and that iodine concentration falls with time.

Hsu et al (3) teach that using dissolved elemental iodine in the presence of KI, pH=7, T=37° C. and an iodine concentration of about 20 ppm, Polio 1 can be killed to about the 99.996% level after 10–20 minutes contact time. However, the reference also shows that the presence of iodide ion actually inhibits the rate and amount of viral inactivation. Although the kill ratios meet the USEPA guidelines, they only do so at body temperature, and not at the colder temperature required by the USEPA. A viral concentration of about $4.5 \times 10^5$ PFU/ml, which is about 20 times too strong, relative to the USEPA specifications was used.

Cramer et al., (4) have demonstrated that dilute tincture of iodine, at 30 ppm. in contact with Poliovirus Type 3 for 30 minutes, at a pH of 10 and T=27° C., kills to about the 99.99999% level. However, although USEPA-required kill ratios were achieved, these were not under the strenuous conditions dictated by the USEPA testing protocol. Further, unfortunately, the experiments involved about $1 \times 10^6$ PFU/ml of Polio 3 which is about 300 times too much.

Taylor and Butler (5) teach that Polio I at 30 $\mu$M dissolved, elemental "Iodine", (specification unknown) at 5° C., pH=9 and a 10 minute contact time kill Polio I to about the 99.8% level. However, the concentrations of virus or "Iodine" is not given. Further, USEPA kill levels were not met.

Alvarez et al. (6) show that, at pH=10, T=25° C., with a contact time of about 15 minutes, Polio 1 could be killed to the 90–99% level using about 1–2 ppm of iodine from a tincture. This reference also shows that iodine inactivates Polio 1 by affecting the ability of the virus to be absorbed by host cells. Unfortunately, these conditions did not meet the desired kill ratios set forth by the USEPA guidelines.

Accordingly, there still remains a need for an efficacious process for killing viruses, particularly Polio I, that satisfies the USEPA experimental guidelines and kill standards and which process also kills bacterial to the degree as presently seen in the art.

PUBLICATIONS

1. Chang, S. L., *J. Amer. Pharm. Ass.*, (1958), 47, pp. 417–423.
2. Berg G. et al. Virology (1964), 22, pp. 469–481.
3. Hsu et al. Journal of Epidemiology (1996), 82, 3, pp. 317–
4. Cramer W. N. et al (1976), 48, 1, pp. 61–76.
5. Taylor G. R. and Butler M., J. Hyg. Camb., (1982), 89, pp. 321–328.
6. Alvarez M. E. and O'Brien R. T. Applied & Environmental Microbiology (November 1982), 44, 5, pp. 1064–1071.

SUMMARY OF THE INVENTION

It is an object of the present invention to provide an efficacious process for killing bacteria present in drinking water, which process meets the USEPA guidelines.

It is a further object to provide an efficacious process for killing viruses present in drinking water, which process meets the USEPA guidelines.

It is a yet further object to provide a water treatment system and apparatus which provides the aforesaid two objects of the invention.

Accordingly, in one aspect the invention provides a method of disinfecting water to kill bacteria and viruses using iodine species comprising hypoiodous acid and iodine in aqueous solution, said method comprising treating said water containing said bacteria and viruses with a disinfecting effective amount of said iodine species at a pH selected from 9–10 to provide bacteria and virus-free water.

Preferably, the iodine species concentration is selected from 2–200 ppm and, more preferably, 10–20 ppm. Most preferably, the disinfecting solution consists essentially of HOI and $I_2$.

By the term iodine species as used in this specification is meant, collectively, dissolved molecular iodine and hypoiodous acid species present over the pH range 9–10. The ppm concentrations herein refer to the concentrations of these species determined as iodine species which are chemically free to react with pathogens, i.e. the total amount of $I_2$ and HOI.

We have found that a suitable contact time ranges from about 1 to 30 minutes at pH 9–10, and depends on the temperature and iodine species concentration. In the dynamic process aspect of the present invention, a suitable contact time is about 10 minutes at a pH of 9.5, concentration of 10–15 ppm and temperature of between 12°–18° C.

In a preferred aspect of the invention, the efficacious iodine species-containing water is prepared by blending a minor amount of relatively highly concentrated iodine species solution with a major amount of untreated water under the treatment conditions as hereinbefore defined.

Most preferably, we have found that a most satisfactory method of attaining a suitably iodine species-concentrated aqueous solution is under dynamic aqueous flow conditions wherein a flow of water is passed through elemental iodine in the form of flakes at such a rate as to produce a desired concentration, preferably 100–500 ppm. Addition of this concentrated solution to the main water supply to be treated is at a rate as to produce the desired 10–20 ppm iodine species concentration.

In a further aspect, the invention provides a water treatment system for producing bacteria- and virus-free water from a bacteria- and virus-containing water supply, said system comprising (a) generator means for holding solid elemental iodine and to allow solubilization of said iodine under dynamic aqueous flow;
(b) means for feeding a first portion of said water supply to said generator means to produce an aqueous concentrated iodine solution;
(c) means for providing a second portion of said water supply;
(d) means for providing said aqueous concentrated iodine solution to said second portion of said water supply to provide a blended water supply;
(e) storage means for holding said blended water supply to provide said bacteria- and virus-free water;
(f) means for measuring water flow of said first and said second portions;
(g) means for measuring the pH of said second portion;
(h) means for adjusting the pH of said second portion;
(i) means for measuring the temperature of said concentrated aqueous solution; and
(j) control means for receiving flow data, pH data and temperature data from said means for measuring flow of said first and said second portions, said means for measuring pH of said second portion; said means for measuring temperature of said concentrated aqueous solution and means for adjusting pH of said second portion.

Most preferably, excess iodine species may be readily removed from the treated water by means of iodine and/or iodide strippers.

BRIEF DESCRIPTION OF THE DRAWING

In order that the invention may be better understood, a preferred embodiment will now be described by way of example only with reference to the drawing, wherein FIG. 1 represents a schematic flow diagram of a method, apparatus and system according to the invention, and wherein dotted lines denote electrical connections.

DESCRIPTION OF PREFERRED EMBODIMENT

With reference to FIG. 1, the system comprises a water feed inlet conduit 10 which feeds inlet water to a preconditioner 12. The incoming source water is, typically, a municipal drinking water, hereinafter referred to as the "main flow" which enters the system at, typically, ambient temperature. However, the system of the invention is designed to accept water also at other temperatures of between 0°–40° C. Preconditioner 12 is an optional feature and contingent upon the quality and chemistry of the source water and preconditioner may include prefilters, as well as water softeners or phenol scrubbers.

Main flow water exits preconditioner 12 and passes throughout the system through conduit 14. A pressure gauge 16 measures the pressure of the incoming source water, which pressure is monitored by a computerized controller 18, such that the pressure never exceeds the operating conditions, typically, 45–100 psi. If the pressure limits are exceeded, the system shuts down. A flow meter 20 measures the flow of the main flow and provides this information to controller 18. The operation of the system of this embodiment is controlled to provide a flow rate value selected from between 0–12 USGPM.

Conduit 14 leads to a carbon pre-filter 22 to remove unwanted halogen, trihalomethane and organic residuals and to a particle filter 24 of, typically, wound cotton providing greater than 5 micron filtration to remove fine mineral, organic and carbon particles. Downstream of filter 23 is a pH control station shown generally as 23 having an acid and/or base reservoir 26 and a static mixer 28. Reservoir 26 provides acid or base as the case may be under the control of controller 18 upon pH information provided by a pH meter 30. The preferred base for addition is sodium hydroxide and is mixed with the main flow by means of the static, in line mixer 28.

The pH adjusted-main flow exits static mixer 28 and a portion of the main flow is diverted through a iodine-generator and iodine-sensor loop shown generally as 31 comprising a side conduit 32, pump 34, flow meter 36, two iodine generators 38 in series and iodine sensor 40. The iodine sensor at the wavelength used detects total free iodine, i.e. both $I_2$+HOI. Iodine generators 38 comprise PVC canisters which contain crystalline iodine and have water-entry and liquor-exit holes (not shown). The resultant concentrated iodine solution, herein called "liquor" is blended back into the main flow at a carefully monitored and controlled rate by controller 18. The temperature of the liquor is measured by a thermometer 42 and reported to controller 18 as is the pH of the blended main flow in conduit 14 as measured by a pH meter 44.

Blended main flow is fed through a cyst filter 46 to residence contact tank 48. Cyst filter 46 removes particles and cysts (e.g protozoans, emoebas) having a diameter greater than about 1 micron. From residence tank 48, conduit 14 passes the treated blended main flow water to an activated carbon iodine stripper 50, which effectively removes any free iodine species e.g. molecular iodine and hypiodous acid from the blended main flow. Treated water from iodine stripper 50 is passed to an iodide ion-exchange stripper 52, containing e.g. Purolite resin. Iodine-free, disinfected potable water is discharged from stripper 52 for subsequent use.

The following description illustrates a typical process according to the invention using the apparatus described hereinabove.

Municipal water is fed through inlet conduit 10 through preconditioner 12 at a flow rate selected from 4.5–12 USGPM, pH 5–9, temperature 10° C. and pressure of 85 psi. as measured by pressure gauge 16 under the influence of computer controller 18. Main flow water enters and leaves carbon filter 22 wherein the pH of the main flow is increased by 1–2 pH upon passing therethrough. The amount of acid or alkali, generally sodium hydroxide, delivered to the main flow as 10 molar sodium hydroxide is such that the iodinated blend water as measured by pH meter 44 has a pH of 9.5±0.2 pH. The amount of main flow diverted through loop 32 is controlled by controller 18 and where upon controller 18 instructs pump 34 to deliver an appropriate flow to iodine generators 38 as to generate sufficient aqueous iodine species for the production of a final concentration of 10 ppm. free iodine in blended main flow line 14. A typical flow through loop 32 is 0.08–1.46 USGPM (166 ml./min.–2806 ml./min.) to provide a resultant concentrated iodine value of 100–500 ppm. by passage of the side stream through generators 38 each containing 1.75 kg. pure, crystalline iodine in flake form. Flow rate, temperature and pre-determined solubility curves enable the correct iodine concentration to be generated as determined by sensor 40. Iodine sensor 40 is, preferably, an in-line, spectrophotometric flow-through cell with a dedicated detector tuned to 460 nm for the detection of coloured iodine species, chiefly hypoiodous acid. The main function of sensor 40 is to inform controller 18 when the iodine concentration of the liquor drops below about 130 ppm. Digital thermoprobe monitor 42 measures the temperature of the liquor as it emerges from sensor 40. The temperature value is fed to controller 18 where it is applied to an equation governing the liquor/pump rate, such that the concentration of the liquor and, hence, the blended flow is suitable. It is most preferred that sensor 40 is located within loop 32 as shown in view of the likelihood that the system may sit idle for hours or days, whereupon iodine crystals and the liquor in immediate contact therewith may equilibrate to ambient temperature—which may be different from that of the incoming source water. If temperature sensor 42 is placed in conduit 14 upstream of loop 32, an incorrect amount of iodine liquor could be fed into main line 14 upon blending. In the present embodiment, location of the temperature probe accounts for any gradual cooling or warming of the liquor within the iodine-generator loop, such that corresponding changes in liquor concentration as the temperature of the system re-equilibrates the temperature of the incoming source water. pH meter 44 reports to controller 18 to instruct pH control station 23 to add the appropriate amount of sodium hydroxide, such that the pH of the blended flow after iodination is 9.5.

The iodinated, blended flow is controlled to provide a free iodine concentration selected between 10–20 ppm. The process of the invention, as hereinabove described, operates under a residence time for the iodinated water of 10 minutes to ensure mortality of any viruses and bacteria within the main flow, caused mainly by the presence of HOI at pH 9.5. Passage of the blended iodinated main flow through iodine stripper 50 raises the pH of the main flow by about 1–2 pH units. The activated carbon converts some of the available free molecular iodine to iodides. Passage of the resultant solution through iodide stripper 52 causes the pH of the discharge water to drop by 3–4 units. Trace amounts of molecular iodine (2–4 ppm) may also be removed by the ion exchange resin. The acceptable value for total iodine concentrations, at this stage, is 40 ppb or less. A resultant pH of 5–7 for the discharged water is most acceptable.

Controller 18 is a sophisticated pre-programmed computer capable of monitoring and controlling the desired aspects of the process within the system by communicating with pH, temperature, pressure, flow and $I_2$ sensors placed at strategic locations, as hereinbefore described.

In the embodiment described herein, the controller is accessible via a user operated keypad, such that system parameters may be changed to fine-tune the system when installation occurs, or in the event of a system error, to effect shutdown. Certain operator-defined system parameters may be altered from original input values to compensate for variation in physical and chemical conditions encountered in the field, e.g., pressure, flow rates. Other parameters may be changed by the user to reflect the specific needs of the duty, e.g., iodine concentration and pH of output water. By sensing the temperature and pH of the incoming source water, the controller is able to adjust the pH of the water to about 10.0, such that the dissolution of the iodine then becomes temperature dependent only, and the concentration of iodine in main line 14 is about 10 ppm. Controller 18 is pre-programmed with temperature vs solubility curves for iodine, such that the appropriate amount of liquor at the correct iodine concentration is delivered into the main flow. The dissolution of iodine effects a pH drop of about 0.5 pH units while the pH of water in the main line will be adjusted to about 9.5.

EXAMPLES

Example 1

An evaluation of the virucidal activity on Poliovirus Type I of the process of the invention, which process provides a 10 ppm iodinated test water, pH 9.5 at 4° C. at a 10 minute exposure, was conducted under the following protocol.

100 ml. each of (i) distilled water at pH=7.25, (ii) municipal Dartmouth (Nova Scotia, Canada) water adjusted to pH=9.5; and (iii) Test Water were dispensed in glass bottles and chilled to refrigeration temperature. Stock Poliovirus Type 1 (P1), the test virus, in a 10 μl aliquot containing approximately $2.6 \times 10^6$ plaque-forming units (PFU) was added to each sample to yield a titer of $2.6 \times 10^4$ PFU/ml in each test sample. Each sample was incubated 10 minutes in a refrigerator, with occasional mixing, subsequently 2 ml. of 0.1% sodium thiosulfate solution was added to each sample to stop further action of iodine and residual virus infectivity in each of the solutions was determined by plaque assay on 6-well BGMK (Buffalo Green Monkey Kidney cells) monolayer cultures.

Example 2

A similar evaluation to that of Example 1 was conducted on test water (2) treated according to the invention at a pH of 10.10, at 10 ppm $I_2$ at 12°–14° C. for 10 minutes.

100 ml. each of (i) distilled water at pH 7.25, (ii) Dartmouth water adjusted to pH=9.5 and (iii) test water (2) were dispensed in glass bottles and left to stand at about 12°–14° C. Stock Poliovirus Type 1 (P1), the test virus, in a 10 μl aliquot containing approximately $2.6 \times 10^6$ plaque-forming units (PFU) was added to each sample to yield a titer of $2.6 \times 10^4$ PFU/ml in all three test samples, respectively. After 1 minutes of incubation at 12°–14° C. with occasional mixing, 2 ml. of 0.1% sodium thiosulfate solution was added to each sample to stop further action of iodine and residual virus infectivity in each of the solutions was determined by plaque assay on 6-well BGMK monolayer cultures.

TABLE 1

Table 1 presents bactericidal and virucidal results from selected literature.

| Reference | Pathogen | pH | T °C. | Contact time (min.) | Iodine source | Iodine conct. (ppm) | % Kill |
|---|---|---|---|---|---|---|---|
| Bacteria | faecal coliform | 7–8.5 | 20° | 30 | ? | 1–8 | 10 |
| | E. coli | 6, 7.5 | 5, 20, 35° | 30 | ? | 1–10 | 100 |
| Virus | | | | | | | |
| 2. | Polio 1 | 6 | 15° | 20 | elemental $I_2$ + KI | .2–2 | 99.99 |
| 3. | S. abortivoequina E. coli H. influenzae f2 bacteriophage Polio 1 | 7 | 37° | 10–20 | elemental $I_2$ + KI | .1–20 | 99.996 |
| 4. | Polio III | 4, 6, 7, 10 | 27° | 30 | tincture of iodine | 30 | 99.99999 |
| 5. | Polio 1 f2 bacteriophage | 5, 7, 9 | 5° | 10 | elemental $I_2$ | 8 | 99.9 |
| 6. | Polio 1 | 5, 8, 6, 7, 10 | 25° | 15 | tincture of iodine | .8–2.5 | 90–99.9 |

Table 2 presents the efficacy of iodination according to the process of the present invention under the stated conditions against K.pneumonia bacterium. The results show that iodinated water at the relatively high pH of 9.5 is as satisfactory as the expected iodination at lower pH 6. The results show that the USEPA guidelines are met, in terms of requisite kill levels at 4° C. against the virulent K.pneumonia bacterium.

TABLE 2

| Sample | ($I_2$) | pH | T | t | Species (Bacteria) | Infusion (pfu/ml) | Recovered (pfu/ml) | % Kill (rel. to control) |
|---|---|---|---|---|---|---|---|---|
| Iodinated water | 2 ppm | 5.90 | 4° C. | 10 min. | K pneumonia | $2.74 \times 10^6$ | <10 | 99.9996 |
| Iodinated water | 4 ppm | 5.99 | 4° C. | 10 min. | K. pneumonia | $2.74 \times 10^6$ | <10 | 99.9996 |
| Iodinated water | 8 ppm | 6.07 | 4° C. | 10 min. | K. pneumonia | $2.74 \times 10^6$ | <10 | 99.9996 |
| Distilled water | 0 ppm | 9.48 | 4° C. | 10 min. | K. pneumonia | $3.60 \times 10^7$ | too numerous to count | confluent overgrowth |
| Iodinated water | 10 ppm | 9.49 | 4° C. | 5 min. 10 min. | K. pneumonia | $2.60 \times 10^7$ | $2.1 \times 10^1$ 0 | 99.999942 |
| Iodinated water | 10 ppm | 9.49 | 4° C. | 5 min. 10 min. | K. pneumonia | $3.60 \times 10^7$ | $9.5 \times 10^1$ 0 | 99.981 |

TABLE 3

Table 3 presents the efficacy of iodination according to the process of the present invention under the stated conditions against Poliovirus I. The results show the efficacy of the iodination process according to the invention against Polio 1. The process of the invention closely follows the USEPA test protocols and exceeds requisite kill ratios.

Viruses

| Sample | ($I_2$) | pH | T | t | Species | Infusion (pfu/ml) | Recovered (pfu/ml) | % Kill (rel. to control) |
|---|---|---|---|---|---|---|---|---|
| Test Water 1 | 10 ppm | 9.5 | 4° C. | 10 min. | Poliovirus 1 | $2.6 \times 10^4$ | 2 | 99.992 |
| Dartmouth water | 0 ppm | 9.5 | 4° C. | 10 min. | Poliovirus 1 | $2.6 \times 10^4$ | $2.53 \times 10^4$ | 2.700 |
| Distilled water | 0 ppm | 7.25 | 4° C. | 10 min. | Poliovirus 1 | $2.6 \times 10^4$ | $2.42 \times 10^4$ | 6.930 |
| Test Water 2 | 10 ppm | 10.00 | 12° C. | 10 min. | Poliovirus 1 | $2.6 \times 10^4$ | 0 | 100.000 |
| Dartmouth water | 0 ppm | 9.5 | 12° C. | 10 min. | Poliovirus 1 | $2.6 \times 10^4$ | $2.53 \times 10^4$ | 2.700 |

Although this disclosure has described and illustrated certain preferred embodiments of the invention, it is to be understood that the invention is not restricted to those particular embodiments. Rather, the invention includes all embodiments which are functional or mechanical equivalence of the specific embodiments and features that have been described and illustrated.

We claim:

1. A water treatment system for producing bacteria- and virus-free water from a bacteria- and virus-containing water supply, said system comprising
   (a) generator means for holding solid elemental iodine and to allow solubilization of said iodine under dynamic aqueous flow;
   (b) means for feeding a first portion of said water supply to said generator means to produce an aqueous concentrated iodine solution;
   (c) means for providing a second portion of said water supply;
   (d) means for providing said aqueous concentrated iodine solution to said second portion of said water supply to provide a blended water supply;
   (e) storage means for holding said blended water supply to provide said bacteria- and virus-free water;
   (f) means for measuring water flow of said first and said second portions;
   (g) means for measuring the pH of said second portion;
   (h) means for adjusting the pH of said second portion;
   (i) means for measuring the temperature of said concentrated aqueous solution; and
   (j) control means for receiving flow data, pH data and temperature data from said means for measuring flow of said first and said second portions, said means for measuring pH of said second portion, said means for measuring temperature of said concentrated aqueous solution and means for adjusting pH of said second portion.

2. A system as defined in claim 1 further comprising means for removing iodine and iodide ions from said bacteria- and virus-free water.

3. A water treatment system for producing bacteria- and virus-free water from a bacteria- and virus-containing water supply, said system comprising
   (a) a generator constructed and adapted for holding solid elemental iodine and to allow solubilization of said iodine under dynamic aqueous flow;
   (b) delivery means constructed and adapted for feeding a first portion of said water supply to said generator to produce an aqueous concentrated iodine solution;
   (c) delivery means constructed and adapted for providing a second portion of said water supply;
   (d) delivery means constructed and adapted for providing said aqueous concentrated iodine solution to said second portion of said water supply to provide a blended water supply;
   (e) storage means constructed and adapted for holding said blended water supply to provide said bacteria- and virus-free water;
   (f) measurement means constructed and adapted for measuring water flow of said first and said second portions;
   (g) measurement means constructed and adapted for measuring the pH of said second portion;
   (h) adjustment means constructed and adapted for adjusting the pH of said second portion;
   (i) measurement means constructed and adapted for measuring the temperature of said concentrated aqueous solution; and
   (j) control means constructed and adapted for receiving flow data, pH data and temperature data from said means for measuring flow of said first and said second portions, said means for measuring pH of said second portion, said means for measuring temperature of said concentrated aqueous solution and means for adjusting pH of said second portion.

* * * * *

UNITED STATES PATENT AND TRADEMARK OFFICE
CERTIFICATE OF CORRECTION

PATENT NO. : 5,853,574
DATED : Dec. 29, 1998
INVENTOR(S) : Harvey, et al

It is certified that error appears in the above-identified patent and that said Letters Patent is hereby corrected as shown below:

Column 1, line 44, change "antipathogenic" to --anti-pathogenic --.

Column 2, line 66, change "bacterial" to --bacteria--.

Column 5, line 2, change "filter 23" to --filter 24--.

Column 5, line 11, change "through a iodine" to --through an iodine--.

Column 8, line 4, change "12°-14°C" to --12-14°C--.

Signed and Sealed this

Tenth Day of August, 1999

Attest:

Attesting Officer

Q. TODD DICKINSON

Acting Commissioner of Patents and Trademarks